US005351380A

United States Patent [19]

Myers et al.

[11] Patent Number: 5,351,380

[45] Date of Patent: Oct. 4, 1994

[54] COMPRESSION TOOL FOR OVERRUN CLUTCH ASSEMBLIES ON AUTOMATIC TRANSMISSIONS

[76] Inventors: Patrick J. Myers, 1480 13th St.; Howard D. Edge, 2075 12th St., both of Fennimore, Wis. 53809

[21] Appl. No.: 158,394

[22] Filed: Nov. 29, 1993

[51] Int. Cl.[5] ............ B23P 19/04

[52] U.S. Cl. ............ 29/259

[58] Field of Search ............ 29/258, 259, 260, 261, 29/262, 263, 264

[56] References Cited

U.S. PATENT DOCUMENTS

| | | | |
|---|---|---|---|
| 3,076,259 | 2/1963 | Stebbins | 29/259 |
| 4,011,648 | 3/1977 | Martinson et al. | 29/264 |
| 5,163,211 | 11/1992 | Rubino et al. | 29/259 |

*Primary Examiner*—Robert C. Watson
*Attorney, Agent, or Firm*—Rhodes & Ascolillo

[57] ABSTRACT

A compression tool for an overrun clutch assembly, the overrun clutch assembly being positioned within a casing having upstanding side walls with a plurality of apertures provided therein, the upstanding side walls of the casing surrounding an outwardly biased clutch component, the compression tool including a hub member, a plurality of spoke members radiating outward from the hub member for engaging at least some of the plurality of apertures provided in the side walls of the casing, a compression member for engaging a surface of the outwardly biased clutch component, the compression member including a substantially annular shaped member, a translation mechanism for positively moving the compression member away from the hub member and in the direction of the outwardly biased clutch component, a releasable connection mechanism for releasably connecting at least some of the plurality of spoke members to the hub member, a pair of substantially upright members extending upward from the compression member, and a cross bar extending between the pair of uprights, the translation mechanism including a shaft attached to the hub member and extending upward to the cross bar, and a mechanism for moving the shaft with respect to the cross bar.

8 Claims, 5 Drawing Sheets

COMPRESSION TOOL FOR OVERRUN CLUTCH ASSEMBLIES ON AUTOMATIC TRANSMISSIONS

BACKGROUND

1. Field of the Invention

The present invention relates to the field of tools used to service clutch assemblies, most particularly so-called "overrun" clutch assemblies (often referred to as "overdrive") found on automatic transmissions.

2. Description of the Related Art

U.S. Pat. No. 4,768,269 relates to a quick change collet that is used to hold a workpiece in a machine (for example, a lathe), and a specialized collet removing tool for removing the quick change collet from the machine.

U.S. Pat. No. 3,368,266 relates to a rapid positioning and clamping apparatus that is disclosed as facilitating assembly and disassembly operations on the clutch piston assembly of automatic transmission clutch units, as well as other articles of work.

U.S. Pat. No. 3,115,699 relates to an automatic transmission spring compressing tool that is said to be adaptable to a great number of makes of automatic transmissions, thereby lowering the investment expenses of automobile repair shops.

SUMMARY OF THE INVENTION

Transmissions, most particularly automatic transmissions, frequently require specialized tools in order to perform service thereon. For example, in order to perform service or repair (e.g., rebuilding) on certain automatic transmissions, it is necessary that the clutch assembly be disassembled to gain access to critical interior areas and components. One such class of transmissions requiring clutch disassembly is the type of automatic transmission that has a so-called "overrun" clutch assembly, in particular, the type of automatic transmissions referred to by the "General Motors" designations T.H.M. 700R4 and 4L60.

There are currently available specialized tools for disassembling the overrun clutch assemblies found on such transmissions. They are, however, large, cumbersome, heavy, and difficult to operate.

Accordingly, one object of the present invention is the provision of a compression tool for overrun clutch assemblies that is smaller, lighter, and simpler in operation than the specialized tools heretofore known.

Another object of the invention is the provision of such a compression tool that is simple in construction and, therefore, inexpensive to manufacture.

In one aspect, the invention generally features a compression tool for an overrun clutch assembly, the overrun clutch assembly being positioned within a casing having upstanding side walls with a plurality of apertures provided therein, the upstanding side walls of the casing surrounding an outwardly biased clutch component, the compression tool including: a hub member; a plurality of spoke members radiating outward from the hub member for engaging at least some of the plurality of apertures provided in the side walls of the casing; a compression member for engaging a surface of the outwardly biased clutch component; and a translation mechanism for positively moving the compression member away from the hub member and in the direction of the outwardly biased clutch component.

Preferably, the compression tool additionally includes a releasable connection mechanism for releasably connecting at least some of the plurality of spoke members to the hub member; the compression tool additionally includes at least a pair of substantially upright members extending upward from the compression member, and a cross bar extending between the pair of uprights, and the translation mechanism includes a shaft attached to the hub member and extending upward to the cross bar, and a mechanism for moving the shaft with respect to the cross bar; and the releasable connection mechanism further includes a mechanism for releasably connecting at least two of the plurality of spoke members to the hub member In another aspect, the invention generally features a compression tool for an overrun clutch assembly, the overrun clutch assembly being positioned within a casing having upstanding side walls with a plurality of apertures provided therein, the upstanding side walls of the casing surrounding an outwardly biased clutch component, the compression tool including: a hub member; a plurality of spoke members radiating outward from the hub member for engaging at least some of the plurality of apertures provided in the side walls of the casing; a compression member for engaging a surface of the outwardly biased clutch component; the compression member including a substantially annular shaped member; a translation mechanism for positively moving the compression member away from the hub member and in the direction of the outwardly biased clutch component; a releasable connection mechanism for releasably connecting at least some of the plurality of spoke members to the hub member; a pair of substantially upright members extending upward from the compression member; and a cross bar extending between the pair of uprights; the translation mechanism including a shaft attached to the hub member and extending upward to the cross bar, and a mechanism for moving the shaft with respect to the cross bar.

Preferably, the translation mechanism additionally includes a hole provided in the cross bar, the shaft passing through the hole in the cross bar, threads provided on the shaft, and a threaded nut threadingly engaging the shaft; the compression tool additionally includes an enlarged central portion provided on the cross bar, the hole being provided in the enlarged central portion, and the threaded nut being positioned over the enlarged central portion; an upper portion of each of the pair of substantially upright members extending upward from the compression member is provided with a journaled aperture therethrough, and the cross bar extending between the pair of uprights is rotatingly mounted within the journaled apertures; and each of the plurality of spoke members is provided with a tool rotatable engaging surface on a distal end thereof.

In yet another aspect, the invention generally features a compression tool for an overrun clutch assembly, the overrun clutch assembly being positioned within a casing having upstanding side walls with a plurality of apertures provided therein, the upstanding side walls of the casing surrounding an outwardly biased clutch component, the compression tool including: a hub member; three spoke members radiating outward from the hub member for engaging at least some of the plurality of apertures provided in the side walls of the casing; a threaded connection between each of the three spoke members and the hub member; each of the three spoke members being provided with a tool rotatable engaging surface on a distal end thereof; a compression member for engaging a surface of the outwardly biased clutch component; the compression member including a substantially annular shaped member; a translation mechanism for positively moving the compression member away from the hub member and in the direction of the outwardly biased clutch component; a releasable connection mechanism for releasably connecting each of the three spoke members to the hub member; a pair of substantially upright members extending upward from the compression member; an upper portion of each of the pair of substantially upright members being provided with a journaled aperture therethrough; and a cross bar extending between the pair of uprights, the cross bar being rotatingly mounted within the journaled apertures; the translation mechanism including: an enlarged central portion provided on the cross bar; a hole provided in the enlarged central portion of the cross bar; a shaft attached to the hub member, the shaft passing through the hole provided in the enlarged central portion of the cross bar; threads provided on the shaft; and a threaded nut threadingly engaging the threads provided on the shaft, the threaded nut being positioned over the enlarged central portion of the cross bar.

The invention will now be described by way of a particularly preferred embodiment, reference being made to the accompanying drawings, wherein:

DESCRIPTION OF THE PREFERRED EMBODIMENT

Figure 1:
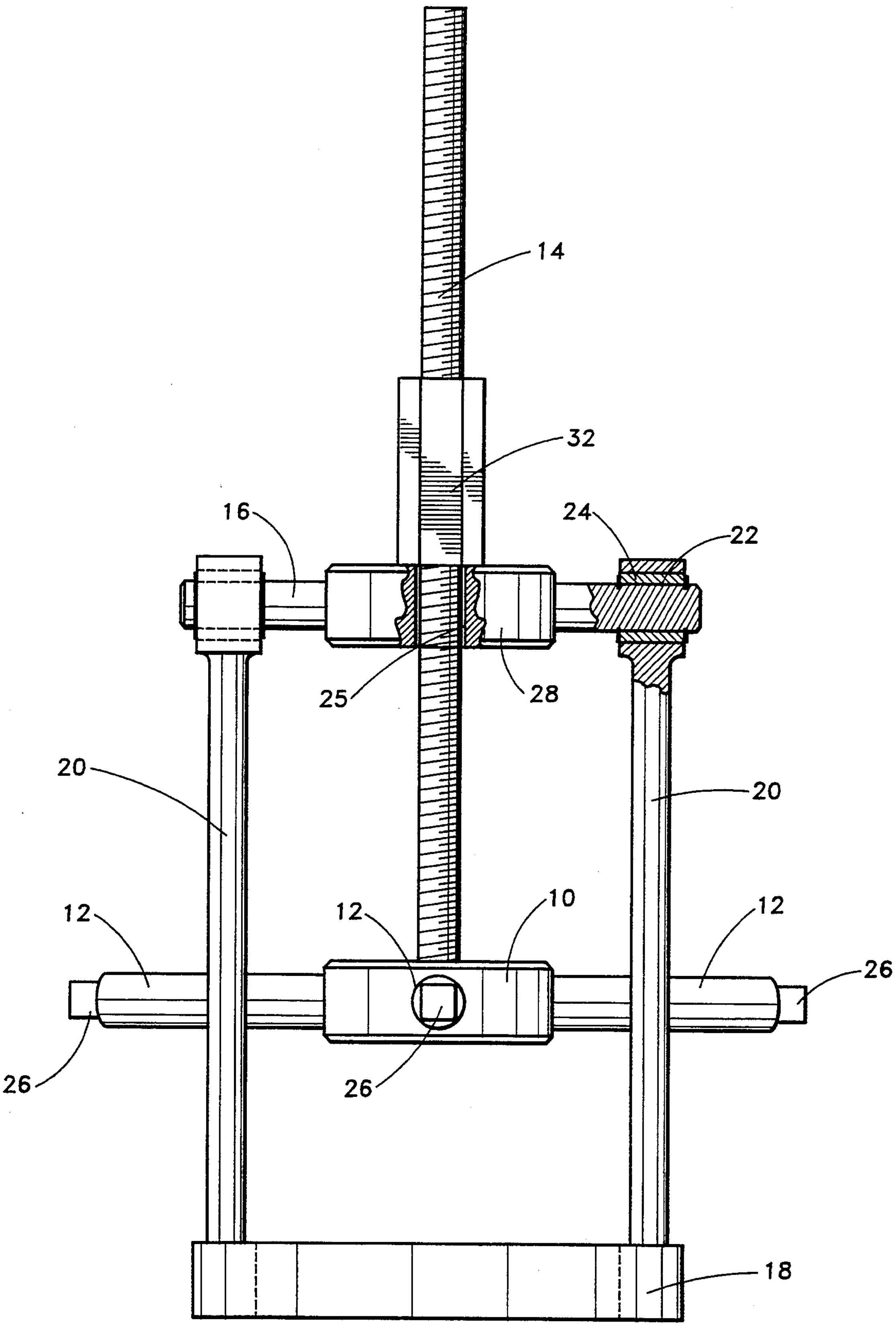
FIG. 1 is a front elevational view of a compression tool constructed according to the present invention.
Figure 2:
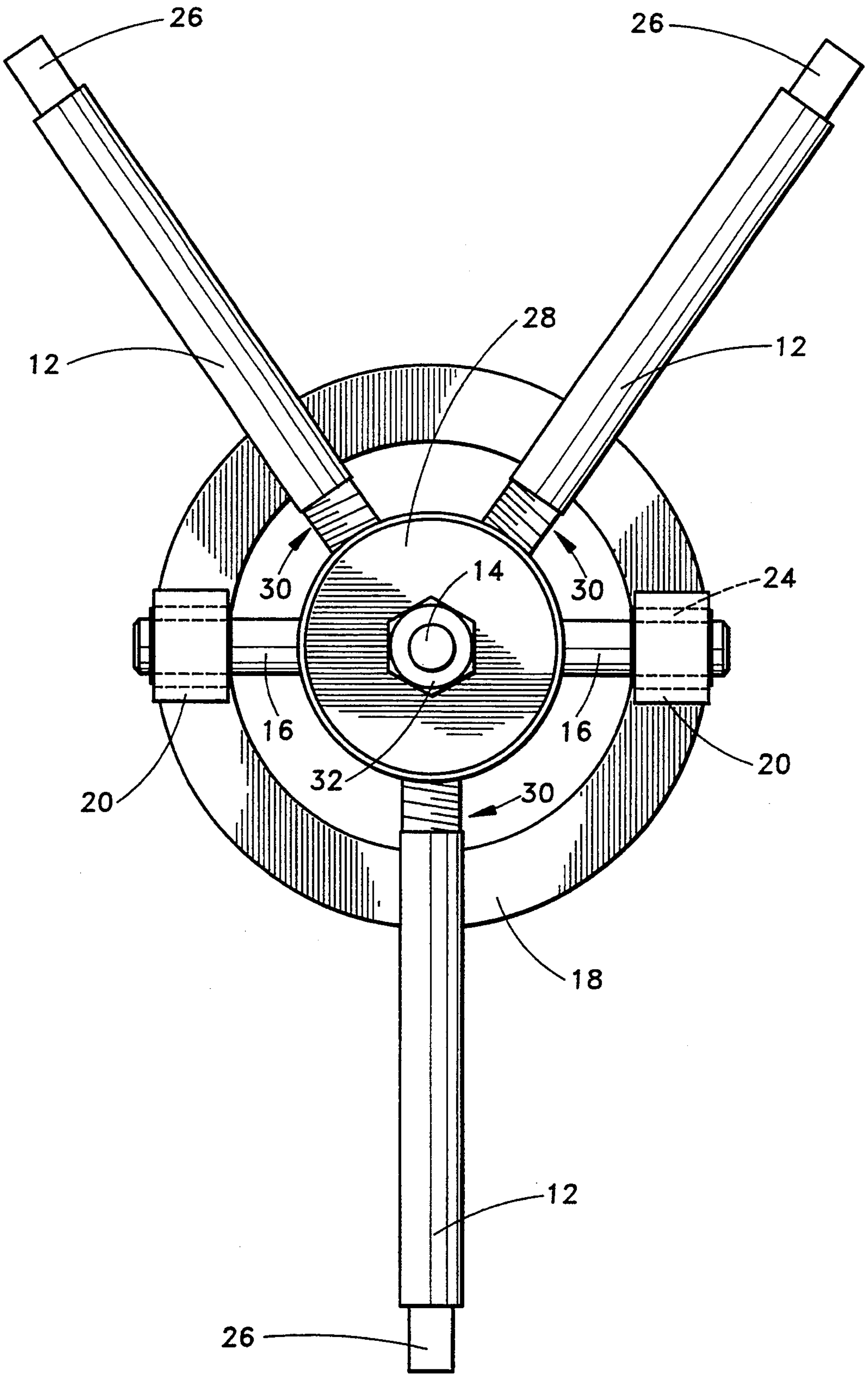
FIG. 2 is a top plan view of the compression tool of FIG. 1.

Referring initially now to FIGS. 1 and 2, a compression tool constructed according to the present invention generally includes a hub member 10 from which a plurality of radially projecting spoke members 12 extend outward, a threaded shaft 14 that is attached to the hub member 10 and that extends upward therefrom to pass through a cross bar 16, a compression member 18, which, in use, bears on an outwardly biased clutch component and applies pressure thereto, and a pair of upright members 20 that are positioned on opposite sides of the threaded shaft 14 and that extend between the compression member 18 and the cross bar 16. The connections between the cross bar 16 and the upright members 20 are preferably constructed as journaled bearings, with each of the upright members 20 being provided with a throughgoing aperture 22, an annular bearing 24 positioned therein, and with each of the two opposite ends of the cross bar 16 being rotatably mounted within one of the annular bearings 24.

In overrun clutch assemblies provided in automatic transmissions of the type discussed above, the clutch component upon which the compression member 18 bears will normally be a spring loaded piston which becomes spring biased after the hydraulic fluid is removed from the transmission.

The cross bar 16 is provided with a hole 25 extending vertically therethrough through which the threaded shaft 14 passes. The hub member 10 is preferably of substantially circular shape when viewed in plan, and the cross bar 16 preferably has an enlarged central portion 28 positioned directly thereover, the enlarged central portion 28 preferably being of substantially the same circular shape as the hub member 10, when viewed in plan.

As is seen most clearly in FIG. 2, the compression member 18 is preferably of substantially annular (or "ring") shape. Also referring to FIG. 2, it will be seen that the spoke members 12 are not, in the preferred embodiment described herein, necessarily positioned at equally spaced points about the periphery of the compression tool. Rather, the spoke members 12 are so positioned that they will properly engage apertures that are already provided in the casing of the particular transmission being worked on, as described more fully below. The preferred embodiment of the compression tool described herein is particularly adapted for use in conjunction with the T.H.M. 700R4 and 4L60 automatic transmissions discussed above, and in such case, the present inventor has achieved good results with the provision of three spoke members 12 which are spaced so as to provide a 70 degree angle between two of the spoke members 12, and with the axis of the remaining third spoke member 12 bisecting the angle between the first two spoke members 12 and extending away therefrom, as is shown in FIG. 2.

Each of the spoke members 12 is connected via a releasable connection to the hub member 10, preferably in the form of a threaded connection 30 between the proximal end of each of the spoke members 12 and the hub member 10. Additionally, each of the distal ends of each of the spoke members 12 is provided with a tool engagable rotating surface 26 thereon, preferably in the form of flat surfaces engagable by a wrench (e.g., wrench flats). Finally, a mechanism is provided for forcing the compression member 18 downward and away from the hub member 10. Preferably, this translation mechanism includes a threaded nut 32 that threadingly engages the threaded shaft 14, that is positioned over the enlarged central portion 28 of the cross bar 16, and that bears thereon.

Figure 3:
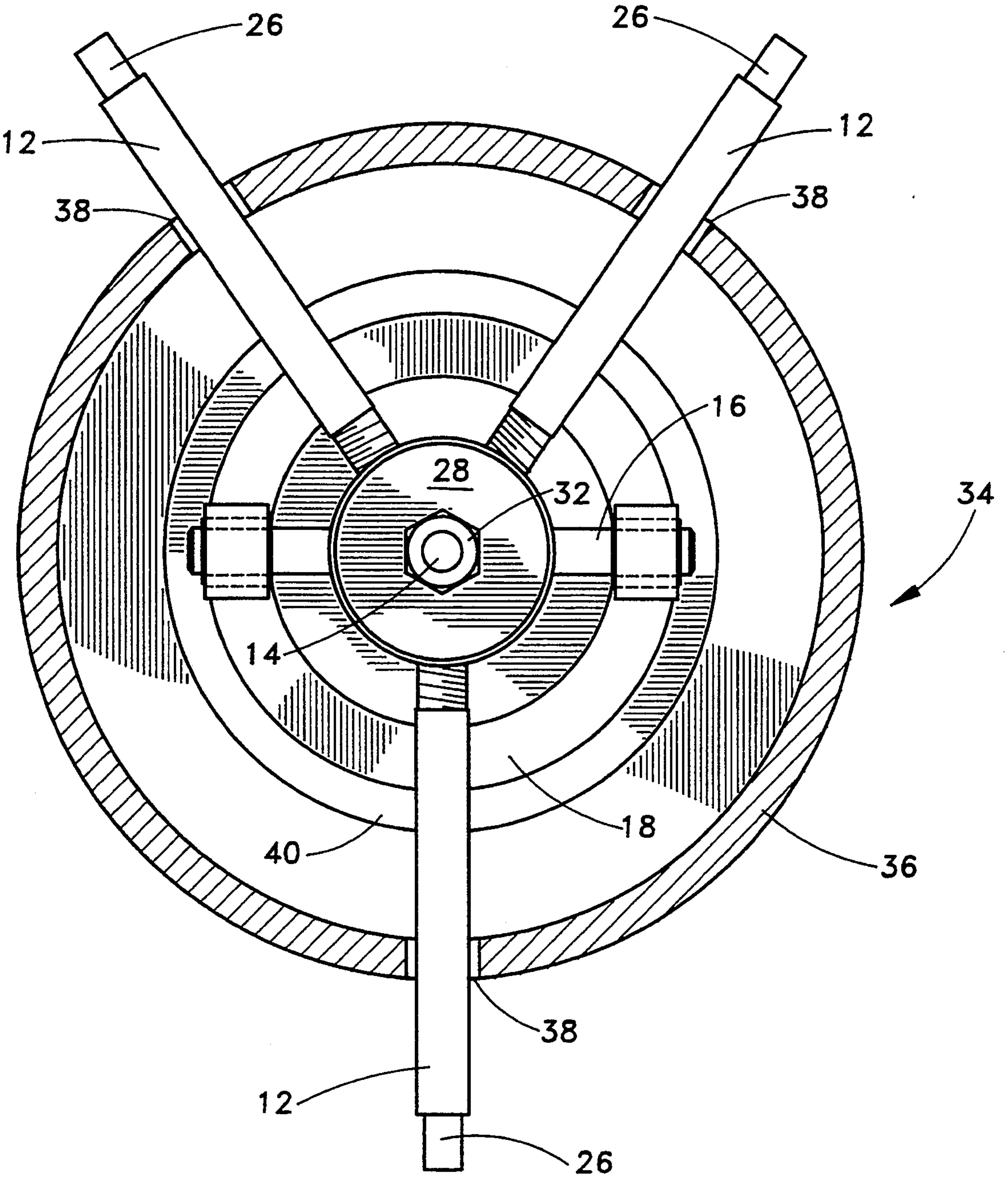
FIG. 3 is a partially cross sectional top plan view of the inventive compression tool in use and positioned within a transmission and engaging the clutch assembly thereof.
Figure 4:
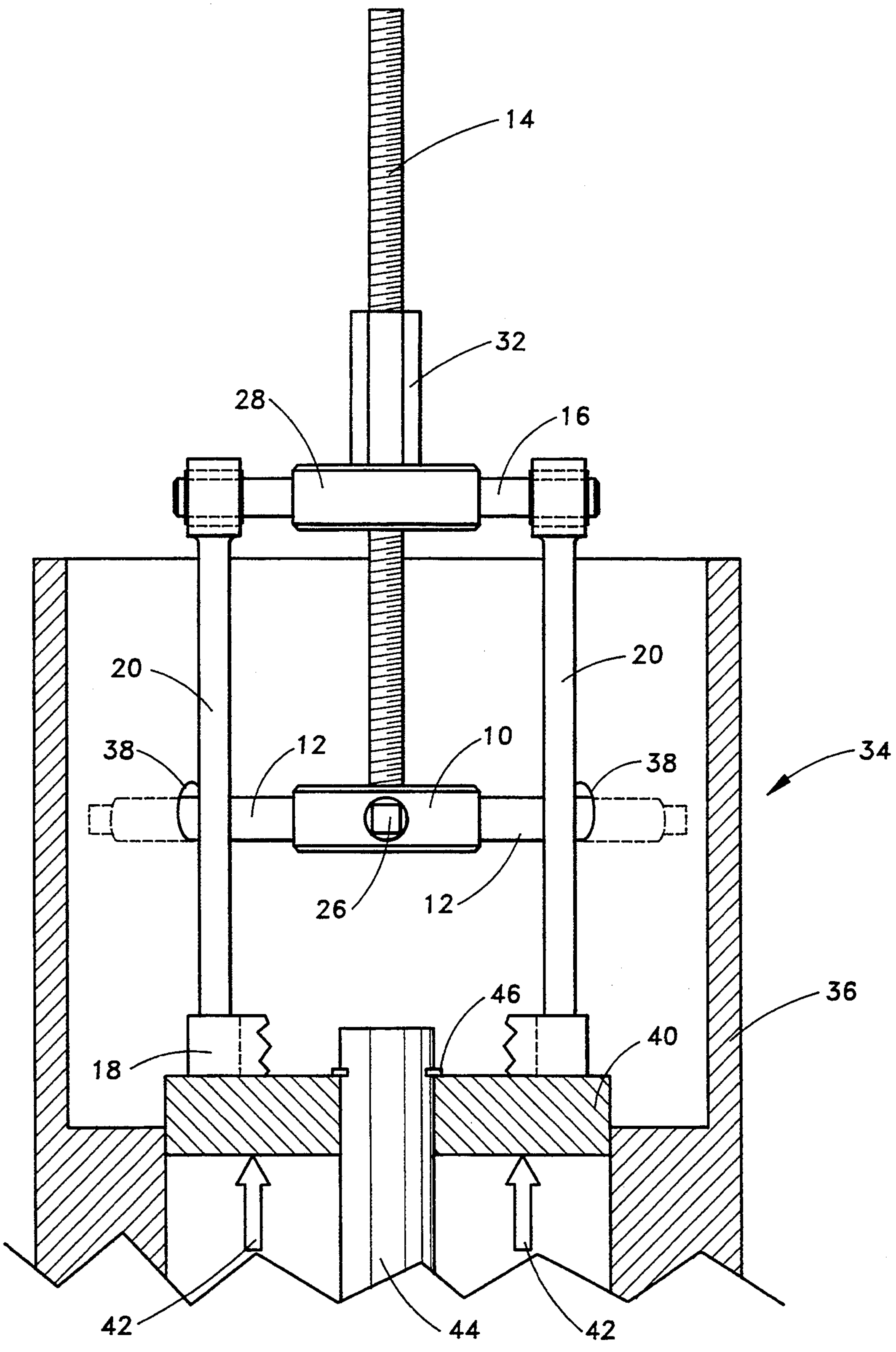
FIG. 4 is a partially cross sectional front elevational view of the inventive compression tool in use as shown in FIG. 3.
Figure 5:
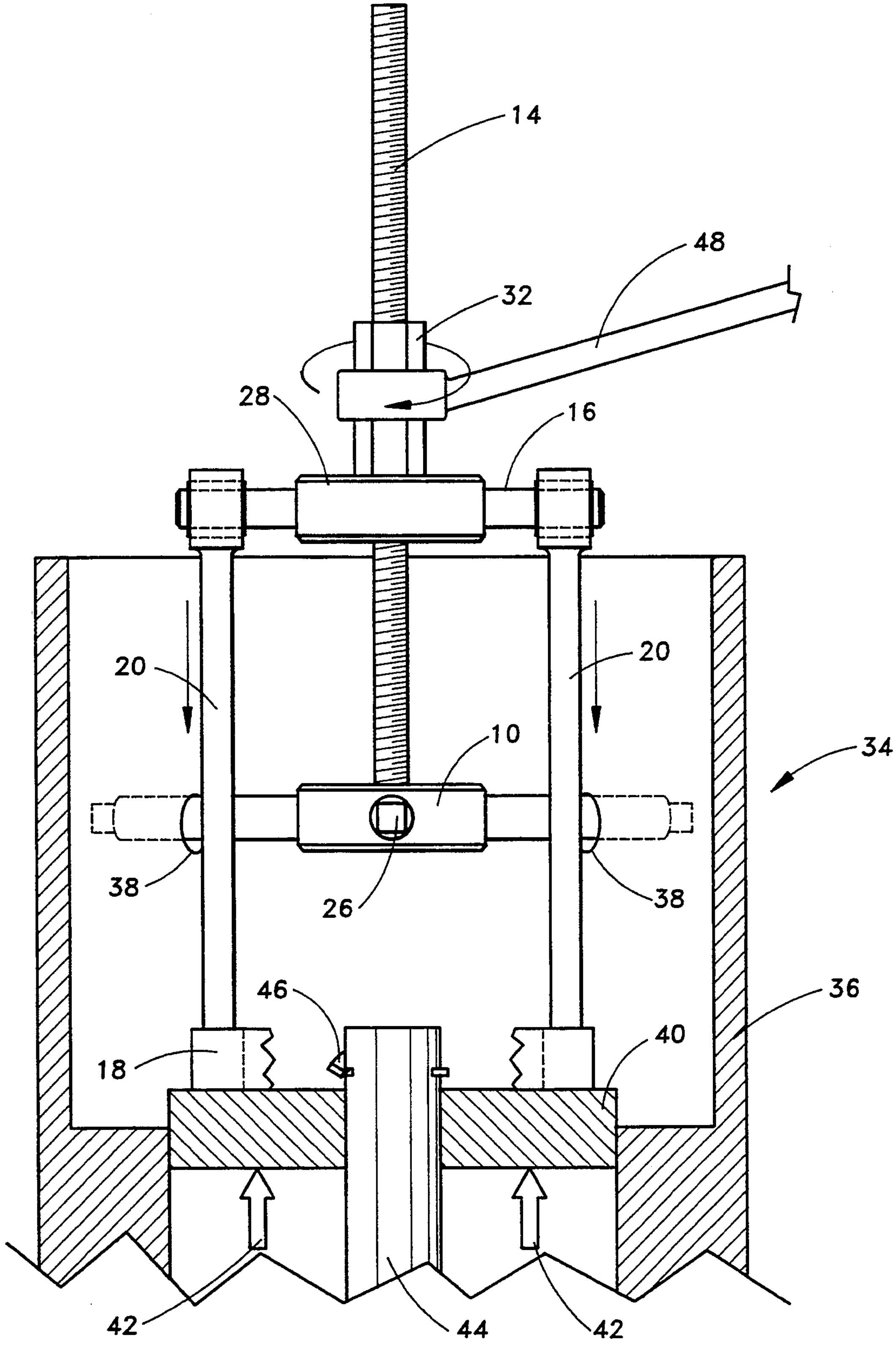
FIG. 5 is a partially cross sectional front elevational view corresponding to FIG. 4, but showing the tool exerting a compression force on the clutch assembly of the transmission.

Use of the inventive compression tool is illustrated in FIGS. 3–5, wherein there is shown the casing 34 of an automatic transmission of the type, or similar to, those discussed above, the casing 34 having a upstanding peripheral wall 36 provided with a number of apertures 38. The automatic transmission also includes an overrun clutch component 40 that is outwardly biased (i.e., biased toward the exterior of the casing 34) by biasing forces 42 generated within the overrun clutch. Normally, the clutch component 40 will be a spring loaded piston, as discussed above. The clutch component 40 is mounted on a central shaft 44 and retained there, against the forces 42, by a retaining ring 46, the removal of which is often necessary for repair or other servicing of the transmission.

Some or all of the projecting spoke members 12 are disengaged from the hub member 10 by disengaging the threaded connections 30 through use of an appropriate tool on the tool engaging surfaces 26, and the compression tool is positioned within the casing 34 so that the compression member 18 abuts the clutch component 40 and surrounds the central shaft 44 and the retaining ring 46. The removed spoke members 12 are then inserted through the apertures 38 in the casing 34 and reconnected to the hub member 10 to achieve the configuration illustrated in FIG. 4. At this point, a tool 48 (e.g., a wrench) is used to rotate the threaded nut 32 and force the enlarged central portion 28 of the cross bar 16 toward the hub member 10. As illustrated in FIG. 5, this moves the compression member 18 in the direction of the clutch component 40, which is forced inward against the biasing forces 42, allowing the retaining ring 46 to be removed. Reinstallation of the retaining ring 46 is accomplished by substantially reversing the above-described removal procedure.

While the invention has been herein described by way of a particular preferred embodiment, various substitutions of equivalents may be effected without departing from the spirit and scope of the invention as set forth in the following claims.

What is claimed is:

1. A compression tool for an overrun clutch assembly, the overrun clutch assembly being positioned within a casing having upstanding side walls with a plurality of apertures provided therein, the upstanding side walls of the casing surrounding an outwardly biased clutch component, said compression tool comprising:

- a hub member;
- a plurality of spoke members radiating outward from said hub member for engaging at least some of the plurality of apertures provided in the side walls of the casing;
- a compression member for engaging a surface of the outwardly biased clutch component;
- translation means for positively moving said compression member away from said hub member and in the direction of the outwardly biased clutch component.
- releasable connection means for releasably connecting at least some of said plurality of spoke members to said hub member; and
- at least a pair of substantially upright members extending upward from said compression member, and a cross bar extending between said pair of uprights, and wherein said translation means comprises a shaft attached to said hub member and extends upward to said cross bar, and means for moving said shaft with respect to said cross bar.

2. A compression tool according to claim 1, wherein said releasable connection means further comprises means for releasably connecting at least two of said plurality of spoke members to said hub member.

3. A compression tool for an overrun clutch assembly, the overrun clutch assembly being positioned within a casing having upstanding side walls with a plurality of apertures provided therein, the upstanding side walls of the casing surrounding an outwardly biased clutch component, said compression tool comprising:

- a hub member;
- a plurality of spoke members radiating outward from said hub member for engaging at least some of the plurality of apertures provided in the side walls of the casing;
- a compression member for engaging a surface of the outwardly biased clutch component;
- said compression member comprising a substantially annular shaped member;
- translation means for positively moving said compression member away from said hub member and in the direction of the outwardly biased clutch component;
- releasable connection means for releasably connecting at least some of said plurality of spoke members to said hub member;
- a pair of substantially upright members extending upward from said compression member; and
- a cross bar extending between said pair of uprights;
- said translation means comprising a shaft attached to said hub member and extending upward to said cross bar, and means for moving said shaft with respect to said cross bar.

4. A compression tool according to claim 3, wherein said translation means additionally comprises a hole provided in said cross bar, said shaft passing through said hole in said cross bar, threads provided on said shaft, and a threaded nut threadingly engaging said shaft.

5. A compression tool according to claim 4, wherein said compression tool additionally comprises an enlarged central portion provided on said cross bar, said hole being provided in said enlarged central portion, and said threaded nut being positioned over said enlarged central portion.

6. A compression tool according to claim 5, wherein an upper portion of each of said pair of substantially upright members extending upward from said compression member is provided with a journaled aperture therethrough, and wherein said cross bar extending between said pair of uprights is rotatingly mounted within said journaled apertures.

7. A compression tool according to claim 6, wherein each of said plurality of spoke members is provided with a tool rotatable engaging surface on a distal end thereof.

8. A compression tool for an overrun clutch assembly, the overrun clutch assembly being positioned within a casing having upstanding side walls with a plurality of apertures provided therein, the upstanding side walls of the casing surrounding an outwardly biased clutch component, said compression tool comprising:

- a hub member;
- three spoke members radiating outward from said hub member for engaging at least some of the plurality of apertures provided in the side walls of the casing;
- a threaded connection between each of said three spoke members and said hub member;
- each of said three spoke members being provided with a tool rotatable engaging surface on a distal end thereof;
- a compression member for engaging a surface of the outwardly biased clutch component;
- said compression member comprising a substantially annular shaped member;
- translation means for positively moving said compression member away from said hub member and in the direction of the outwardly biased clutch component;
- releasable connection means for releasably connecting each of said three spoke members to said hub member;
- a pair of substantially upright members extending upward from said compression member;

an upper portion of each of said pair of substantially upright members being provided with a journaled aperture therethrough; and a cross bar extending between said pair of uprights, said cross bar being rotatingly mounted within said journaled apertures;

said translation means comprising:

an enlarged central portion provided on said cross bar;

a hole provided in said enlarged central portion of said cross bar;

a shaft attached to said hub member, said shaft passing through said hole provided in said enlarged central portion of said cross bar;

threads provided on said shaft; and a threaded nut threadingly engaging said threads provided on said shaft, said threaded nut being positioned over said enlarged central portion of said cross bar.

* * * * *